United States Patent [19]

Welsh

[11] 4,010,236

[45] Mar. 1, 1977

[54] MANGANESE ORE REDUCTION

[75] Inventor: Jay Y. Welsh, Catonsville, Md.

[73] Assignee: Diamond Shamrock Corporation, Cleveland, Ohio

[22] Filed: July 21, 1975

[21] Appl. No.: 597,824

[52] U.S. Cl. .................................. 423/49; 423/605
[51] Int. Cl.$^2$ ...................................... C01G 45/02
[58] Field of Search .............. 75/1, 80; 423/605, 49

[56] References Cited
UNITED STATES PATENTS

| | | | |
|---|---|---|---|
| 1,761,133 | 6/1930 | Laury | 75/1 |
| 1,937,508 | 12/1933 | Bradley | 75/1 |
| 2,733,140 | 1/1956 | Gavle | 75/11 |
| 3,375,097 | 3/1968 | Welsh | 423/49 |
| 3,486,880 | 12/1969 | Vlraty | 75/5 |
| 3,573,033 | 3/1971 | Bouchet | 75/33 |
| 3,860,417 | 1/1975 | Ritzmann | 75/36 |

*Primary Examiner*—M. J. Andrews
*Attorney, Agent, or Firm*—William A. Skinner

[57] ABSTRACT

A method for reducing the higher oxides of manganese in manganese ore using solid fuel intermixed with an ore bed.

10 Claims, 2 Drawing Figures

| PHASE | Mn O$_x$ REACTIONS | GAS COMPO-SITION | CARBON REACTIONS |
|---|---|---|---|
| SURFACE | COLD NEW FEED LAYER | N$_2$, H$_2$O, CO$_2$, O$_2$ (Traces CO, H$_2$) | UNREACTED CARBON |
| I | 2MnO$_2$ → Mn$_2$O$_3$ + ½O$_2$ | | H$_2$ + ½O$_2$ → H$_2$O<br>CO + ½O$_2$ → CO$_2$<br>$\begin{cases}½C + ½O_2 → ½CO_2\\ C + ½O_2 → CO\end{cases}$<br>½C + ½CO$_2$ → CO<br>½C + ½H$_2$O → ½H$_2$ + ½CO<br>(Limited Reaction Below ~1,000°K) |
| II | 3Mn$_2$O$_3$ + CO → 2Mn$_3$O$_4$ + CO$_2$<br>3Mn$_2$O$_3$ + H$_2$ → 2Mn$_3$O$_4$ + H$_2$O<br>Mn$_3$O$_4$ + CO → 3MnO + CO$_2$<br>Mn$_3$O$_4$ + H$_2$ → 3MnO + H$_2$O | N$_2$, H$_2$O, CO$_2$, CO, H$_2$ | ½C + ½CO$_2$ → CO<br>½C + ½H$_2$O → ½H$_2$ + ½CO |
| III | Mn$_3$O$_4$ + CO → 3MnO + CO$_2$<br>Mn$_3$O$_4$ + H$_2$ → 3MnO + H$_2$O<br>MnO | N$_2$, H$_2$O, CO$_2$, CO, H$_2$ | ½C + ½CO$_2$ → CO<br>½C + ½H$_2$O → ½H$_2$ + ½CO |
| IV | MnO | N$_2$, H$_2$O, CO$_2$, CO, H$_2$ | ½C + ½CO$_2$ → CO<br>½C + ½H$_2$O → ½H$_2$ + ½CO<br>(Limited Unreacted Carbon Residue) |
| V | MnO | N$_2$, H$_2$O, CO$_2$ | NO CARBON |

FIGURE 1

| PHASE | MnO$_x$ REACTIONS | GAS COMPOSITION | CARBON REACTIONS |
|---|---|---|---|
| SURFACE | COLD NEW FEED LAYER | N$_2$, H$_2$O, CO$_2$, O$_2$ (Traces CO, H$_2$) ↑ | UNREACTED CARBON |
| I | 2MnO$_2$ → Mn$_2$O$_3$ + ½O$_2$ | | H$_2$ + ½O$_2$ → H$_2$O<br>CO + ½O$_2$ → CO$_2$<br>{ ½C + ½O$_2$ → ½CO$_2$<br>  C + ½O$_2$ → CO<br>  ½C + ½CO$_2$ → CO<br>  ½C + ½H$_2$O → ½H$_2$ + ½CO<br>(Limited Reaction Below ~1,000°K) |
| | | N$_2$, H$_2$O, CO$_2$, CO, H$_2$ ↑ | |
| II | 3Mn$_2$O$_3$ + CO → 2Mn$_3$O$_4$ + CO$_2$<br>3Mn$_2$O$_3$ + H$_2$ → 2Mn$_3$O$_4$ + H$_2$O<br>Mn$_3$O$_4$ + CO → 3MnO + CO$_2$<br>Mn$_3$O$_4$ + H$_2$ → 3MnO + H$_2$O | | ½C + ½CO$_2$ → CO<br>½C + ½H$_2$O → ½H$_2$ + ½CO |
| | | N$_2$, H$_2$O, CO$_2$, CO, H$_2$ ↑ | |
| III | Mn$_3$O$_4$ + CO → 3MnO + CO$_2$<br>Mn$_3$O$_4$ + H$_2$ → 3MnO + H$_2$O<br>MnO | | ½C + ½CO$_2$ → CO<br>½C + ½H$_2$O → ½H$_2$ + ½CO |
| | | N$_2$, H$_2$O, CO$_2$, CO, H$_2$ ↑ | |
| IV | MnO | | ½C + ½CO$_2$ → CO<br>½C + ½H$_2$O → ½H$_2$ + ½CO<br>(Limited Unreacted Carbon Residue) |
| | | N$_2$, H$_2$O, CO$_2$ ↑ | |
| V | MnO | | NO CARBON |

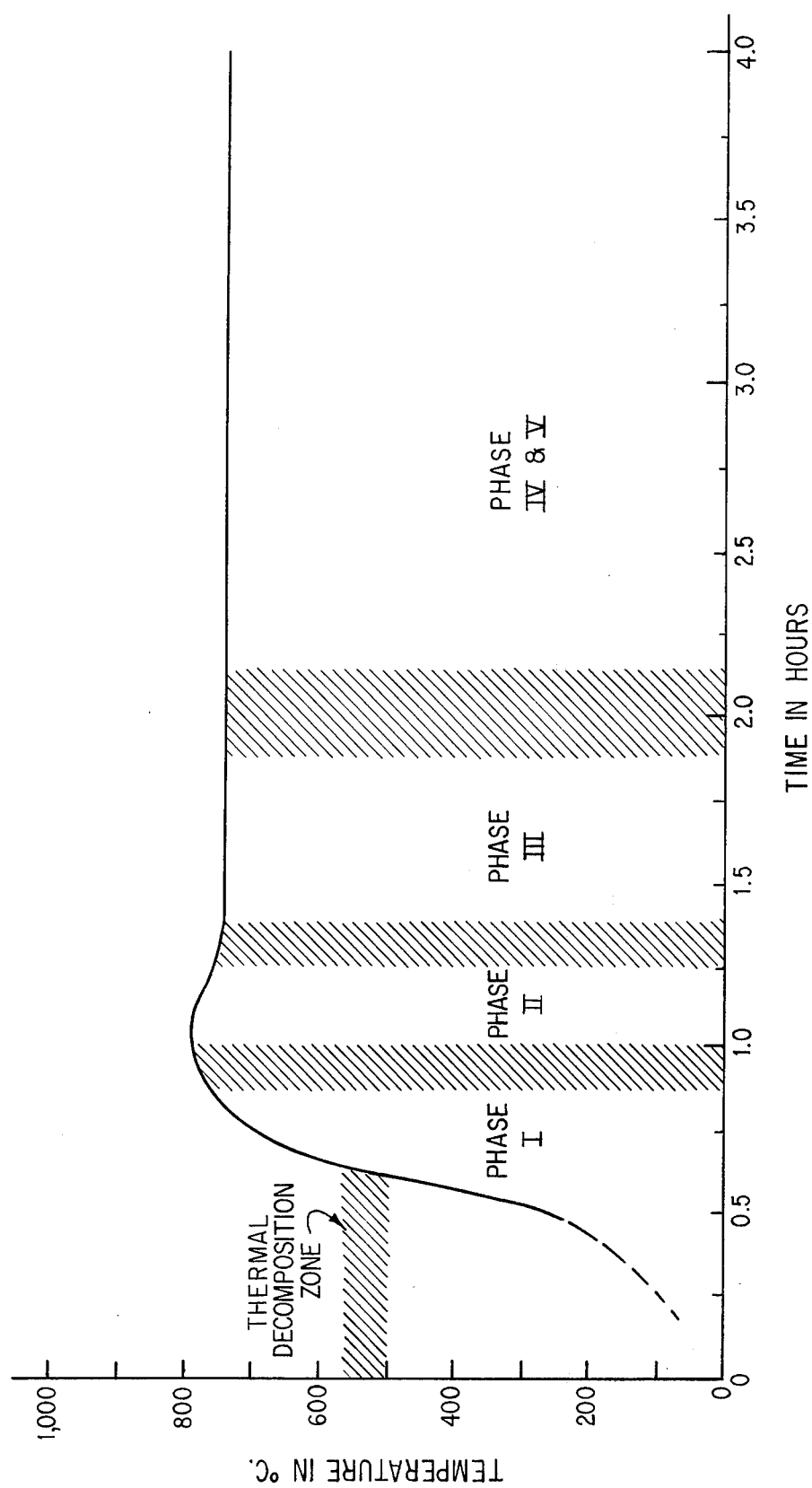

MANGANESE ORE REDUCTION

FIELD OF THE INVENTION

This invention relates generally to a process for reducing the higher oxides of manganese in manganese ore, and more particularly to a pile reduction process utilizing a mixture of solid carbonaceous fuel and crushed manganese ore to prepare manganous oxide.

BACKGROUND OF THE INVENTION

The practice of reducing manganese ore with solid fuels such as coal or coke has generally been limited to two techniques. In the first method a mixture of ground ore and solid fuel is fed into a controlled atmosphere and temperature zone of an indirectly fired kiln. The kiln is rotated to provide for the necessary heat transfer and gas contact throughout the ore bed. Due to time limitations on the period for reduction of the ore, it is necessary to use ground ore in this process. In the second method ground ore and solid fuel are pelletized or compacted and then heated in a substantially inert atmosphere. The pellets are usually carried through the heating zone on a moving belt or grating, and the product is normally sintered.

These conventional techniques involve several undesirable features. Fuel efficiency is generally poor as a result of the heat losses inherent in indirect firing. In addition, it is necessary to grind the raw ore prior to reduction, and raw manganese ore is roughly twice as difficult to grind as reduced ore. A further drawback is the high capital investment and maintenance cost of the equipment involved.

A method for the direct reduction of manganese ore in a bed, or pile, has been disclosed in my U.S. Pat. No. 3,375,097. However, this method involves the use of relatively large quantities of natural gas which is in increasingly short supply. In view of the disadvantages of this and other previous ore reduction methods, it is desirable to develop a practical, economical and energy efficient process for reducing manganese ore with solid fuel.

SUMMARY OF THE INVENTION

It has been discovered that the higher oxides of manganese present in manganese ore can be efficiently reduced using solid fuel. In the process of the invention a nonoxidizing gas at 700°–1000° C. is passed into and through an initial bed of solid carbonaceous fuel and manganese ore which has been at least partially reduced to MnO. A hot, reducing gas mixture is formed which is then passed into a contiguous layer of unreduced manganese ore mixed with solid carbonaceous fuel. Control of the thermal balance parameters allows the chemistry of the reduction process to proceed in stages through the layer of ore and solid fuel. As the reduction proceeds, further fresh layers of unreduced ore and solid fuel may be added to the bed to maintain the cycle.

The chemistry of this solid fuel reduction process is new in functional concept, as are the parameters related to maintaining proper thermal balance. The process of the invention has numerous advantages, including the efficient use of energy from readily available solid fuels, adaptability for use with crushed rather than ground manganese ores, and minimal investment in equipment.

BRIEF DESCRIPTION OF THE DRAWINGS

Other advantages of the invention will become apparent upon reading the following detailed description and upon reference to the drawings, in which:

FIG. 1 is a schematic chart of the crosssection of a typical reduction pile of the invention, showing the various phases or zones through to exist during the reaction;

FIG. 2 is a graph showing a typical temperature profile of a manganese ore-solid fuel pile undergoing reduction.

While the invention will be described with reference to a particular procedure, it will be understood that it is not intended to limit the invention to that procedure. On the contrary, it is intended to cover all alternatives, modifications, and equivalents which may be included within the scope of the invention as defined by the appended claims.

DETAILED DESCRIPTION OF THE INVENTION

The reduction of manganese ore by carbon involves cyclic gas reactions which may be represented in their simplest, overall form by the following equations.

$$\tfrac{1}{2} CO_2 + \tfrac{1}{2} C \rightarrow CO \quad (1)$$

$$CO + MnO_2 \rightarrow MnO + CO_2 \quad (2)$$

The sum of reactions (1) and (2) may then be written as the following composite reaction.

$$MnO_2 + \tfrac{1}{2} C \rightarrow MnO + \tfrac{1}{2} CO_2 \quad (3)$$

Under actual process conditions the chemistry is considerably more complex and reaction (2), as written, probably is not a true representation. When $MnO_2$ is heated to about 800° K. (527° C.) its oxygen vapor pressure reaches about one atmosphere and the reaction $$2 MnO_2 \rightarrow Mn_2O_3 + \tfrac{1}{2} O_2 \quad (4)$$

will take place. Since reaction (4) is endothermic, the surrounding gases supplying heat to this reaction must be substantially above 800° K. (527° C.) and thus are normally above the ignition temperature of CO or of carbon itself. The first step of the reduction process therefore involves reaction (4) which liberates oxygen, followed by the immediate reaction of a portion of the oxygen with available reducing substances. The degree to which this oxygen escapes without reacting is important to the thermal balance of the system. The mechanical features involved in the processing have an overriding influence in this phase of the reduction reaction, and will be discussed in more detail later in the description.

With reference to FIG. 1, and limiting the reactants at this stage of the discussion to manganese and carbon compounds, the following reactions are, or can be, involved in the "phase I" reaction step.

$$2 MnO_2 \rightarrow Mn_2O_3 + \tfrac{1}{2} O_2 \quad (4)$$

$$\tfrac{1}{2} O_2 + CO_2 \quad (5)$$

$$\tfrac{1}{2} O_2 + C \rightarrow CO \quad (6)$$

$$\tfrac{1}{2} O_2 + \tfrac{1}{2} C \rightarrow \tfrac{1}{2} CO_2 \quad (7)$$

½ CO₂ + ½ C → CO       (1)

Reaction (1) requires temperatures near or in excess of about 1000° K (727° C) and is probably not appreciably involved in the immediate zone in which reaction (4) is taking place. Further, reactions (6) and (7) cannot be considered as very efficient, especially in a relatively narrow layer such as exists in a static bed. In a narrow layer, the evolving gases from deeper in the bed can sweep the oxygen out of the reaction layer before it can diffuse to the carbon particles. Reaction (5) is limited by the amount of available CO. If reactions (1) or (6) are not fully effective, the CO available is essentially limited to the amount carried out from deeper in the reaction bed. In short, depending on the process conditions, the first phase of the reduction process [reactions (4), (5), (6), (7) and (1)] may not be stoichiometrically balanced and oxygen can escape unreacted.

It is important to the overall understanding of processes employing solid fuel as a reducing agent for manganese ore to point out here that a mixture of solid fuel and manganese ore cannot provide a self-propagating reaction capable of being carried out in a simple container under static conditions. This is primarily due to the loss of unreacted oxygen in the initiating stages of the reduction process, as discussed above.

To fully understand the effect of oxygen loss it is necessary to evaluate the heats of reaction involved. The heat of overall reaction (3) is −15.6 kilocalories/mole of MnO at 1100° K. (827° C.), which compares favorably with the +15.5 kilocalories/mole required to raise the reactants (at 75% purity) to 1100° K. This is an apparent indication that the reaction should be thermally stable and possibly self-propagating. However, as has been pointed out, oxygen may be lost from the reaction zone where MnO₂ is undergoing thermal decomposition. There is also the likely possibility that an appreciable amount of CO will be swept away with the evolving CO₂. In this connection it should be noted that the amount of CO₂ gas generated by overall reaction (3) is about 800 times the void space between the reactants (ore and carbon particles), and that the CO from reaction (1) must diffuse back through the issuing CO₂ if it is to react with the ore particles.

If these losses are taken into account reaction (3) is more properly written as

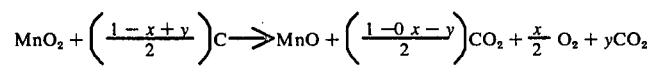
(3a)

where $x$ = mole fraction of MnO produced by loss of unreacted O₂, $y$ = mole fraction of MnO produced by reaction of O₂ to CO level only, and (1-$x$-$y$) = mole fraction of MnO produced by reaction of O₂ to CO₂. As an example assume 0.9 moles of MnO are produced in accordance with reaction (3), i.e. (1-$x$-$y$) = 0.9; 0.08 moles by loss of unreacted oxygen, i.e. $x$ = 0.08; and 0.02 moles by loss of CO, i.e. $y$ = 0.02. Reaction (3a) now becomes

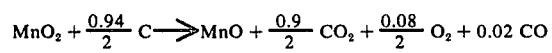

and the heat of reaction is only −11.5 kilocalories/mole of MnO, clearly insufficient to permit a self-sustaining reaction. It is apparent that very little oxygen or CO can be lost without markedly affecting the thermal balance of the process.

After the MnO₂ in a particular reaction zone has been substantially converted to Mn₂O₃ by the phase I reactions, a second or "phase II" system of reactions is established which is more truly of a cyclic nature, as follows.

½ CO₂ + ½C → CO       (1)

Mn₂O₃ + ⅓ CO → ⅔ Mn₃O₄ + ⅓ CO₂       (8)

⅔ Mn₃O₄ + ⅔CO → 2 MnO + ⅔ CO₂       (9)

Mn₂O₃ + CO → 2 MnO + CO₂       (10)

Reaction (10) represents the sum of reactions (8) and (9) and in conjunction with (1) clearly shows the cyclic nature of the reactions. The actual reduction process is stepwise and best represented by reactions (1), (8) and (9). The overall reaction in this case is Mn₂O₃ + ½C → 2 MnO + ½ CO₂       (11)

It is important to note that the heat of reaction of (11) is only −3.18 kilocalories, or −1.59 kilocalories/mole of MnO produced at 1100° K., as compared to −15.6 kilocalories/mole of MnO in the case of reaction (3).

The chemistry and thermal features of pile reduction can now be described with particular reference to the present invention. The reaction sequence of each successive "layer" of the ore-solid fuel mixture is shown in FIG. 1. The phase I reactions have been discussed previously and the loss of oxygen explained. The reactions of water vapor with carbon and the reactions of hydrogen with manganese oxides are also included in FIG. 1. These reactions are important in the disclosed process since, as will be shown, the primary gases entering the pile may have a high water vapor content. From a thermodynamic point of view the reaction of water vapor with carbon is quite similar to the reaction of carbon dioxide with carbon. Similarly, the reaction of hydrogen with manganese oxides parallels the reaction of CO with manganese oxides.

The phase I reaction temperature is largely self-controlling. The hot gases generated from the high exothermic reactions of CO or hydrogen with oxygen will carry more, or less, heat outward depending upon their peak temperature. The higher the temperature the greater the percentage of MnO₂ thermally decomposed, and the greater the loss of unreacted oxygen. A higher oxygen loss will in turn result in a lower production of heat in the next step of this reduction sequence, and so on. The thermally self-regulating aspects of the first stage (phase I) of the reduction, which involves the solid fuel (carbon) reactions to only a very limited degree in the process of this invention, is also described fully in my U.S. Pat. No. 3,375,097, the disclosure of which is hereby incorporated by reference.

The next stage in the reduction sequence of my improved process is shown as phase II in FIG. 1. Phase II is unique to solid fuel reduction. The overall reactions are cyclic and each step requires the diffusion or transport of a gaseous reactant to a solid reactant. An important feature of the overall process is that the cyclic reactions of phase II are not confined to a limited volume element in which specific reactants are required to react with each other. Instead a zone or layer of appreciable width is always involved. The cyclic stoichiometry of the reactions is preserved only when the entire reaction layer is viewed as a whole. It is understood that gases are continuously moving upwardly and outwardly through the bed. Thus $CO_2$ or $H_2O$ will react with carbon at one point to produce CO and $H_2$, which move on a short distance and react with ore particles to produce a lower oxide of manganese while regenerating $CO_2$ and $H_2O$, and so on. The result is a steady state reaction band or zone of characteristic chemistry which moves outwardly through the bed.

The overall heat of the reactions of phase II is near zero and the reaction is therefore thermally well behaved, i.e. it neither cools itself down which would slow the reaction rate, nor creates gross excess heat which would fuse the ore.

The phase III step represents the final stages of the ore reduction. The overall reaction $$Mn_3O_4 + \tfrac{1}{2} C \rightarrow MnO + \tfrac{1}{2} CO_2 \qquad (12)$$

is endothermic (+7.42 kilocalories). If this heat loss were not compensated for by hot primary gases passing up through the bed, the reactants would gradually cool and the reaction would stop. Further, this cooling trend would be carried on to affect the phase II reactions and the entire reduction process would cease.

Phase IV simply represents a zone in which a small residue of unreacted carbon remains. The endothermic reactions between the carbon and the hot $CO_2$ and $H_2O$ gases passing outwardly through the bed will continue until all of the carbon is used up, leading to an ever-widening zone containing only MnO and inert gangue residuals. This zone is represented by phase V of the process in FIG. 1.

In contrast to the pile reduction process of the invention, in kiln reduction methods the distinct reaction zones described are not present due to continuous mixing of the bed. The phase I and phase II reactions are in effect combined into a generally high exothermic zone (little oxygen escapes from a kiln to regulate the exothermic reactions), while phase III and phase IV are combined into an endothermic zone. The kiln walls must function as a heat sink or heat source depending on the heat effects involved, and therefore maintain the proper reaction temperatures. In general, heat transfer between the walls of the kiln and the contained mass of fine material is inefficient. Proper loading of the kiln is critical so that adequate heat transfer can take place to control the thermal requirements of the reaction.

In the process of the invention the heat requirements for the phase III and phase IV reactions are supplied by hot primary gases forced upwardly and outwardly through the bed from an underlying hearth. The efficiency of this type of heat transfer is very high. These gases are designed to be rich in $CO_2$ and $H_2O$ to promote reaction (1) and its counterpart $$\tfrac{1}{2} C + \tfrac{1}{2} H_2O \rightarrow \tfrac{1}{2} H_2 + \tfrac{1}{2} CO \qquad (1a)$$

As previously noted, both phase I and phase II reactions are either thermally self-sufficient or thermally self-controlling, while the amount of heat required to maintain the phase III and phase IV reactions is relatively modest. Further, the surface of the operating pile is relatively cool (generally about 90° C., the dew point of the issuing gases) and thermal losses from this source are low. Thus the external heat requirements of this process are extremely low, in marked contrast to the high heat requirements of an indirect gas or oil fired kiln.

In the general operation of the process of the invention, hot primary gases are generated in a combustion chamber external to the ore pile. The source of the primary gases may be the combustion of natural gas, propane, butane, oil of any grade, or possibly coal or coke. In general, the product gases from combustion of the preferred fuels must be neutral or have only a slight reducible content. However, they will often have a temperature above that which is desirable for proper operation of the reduction process, and usually will be above 1350° C. A convenient and desirable way to lower the temperature of the combustion product gases to the preferred range is to introduce water or steam. This is normally done in the after portion of the combustion chamber. The additional water vapor in the hot primary gases entering the pile is an advantage in promoting the desired chemistry of the reduction process, as previously discussed.

The hot primary gases are transferred to the reduction pile by a suitable insulated pipe, and are introduced into a hearth underlying the ore bed. The gases entering the reduction pile should be within the temperature range of from about 700° to about 1000° C., and a temperature between 850° and 950° C. is preferred for smoothest operation. These primary gases should be essentially non-oxidizing in nature, i.e. they should contain little or no free oxygen, and preferably are neutral or even slightly reducing. The gases should further contain substantial amounts of $CO_2$ or $H_2O$, sufficient to provide adequate initial reactants for reactions (1) and (1a).

The velocity of the gases entering the reduction bed should of course be below the level which would cause movement or segregation of the ore and fuel particles. It has also been found advantageous to provide a bed of coarse slag overlaying the hearth as a means for improving the distribution of the primary gases into the reduction bed proper. The even gas distribution pattern obtained by use of the coarse slag results in uniform sequential reaction zones.

The ore-fuel bed is formed over the hearth and gas distribution means be feeding the mixture in successive contiguous layers of about 2 to about 6 inches. The raw ore used is primarily in the form of $MnO_2$, but the other higher oxides $Mn_2O_3$ and $Mn_3O_4$ will also be present as the reaction proceeds. The ore may be crushed to a suitable size, normally in the range of about ¼ inch and smaller to about ¾ inch and smaller, prior to mixture with the solid carbonaceous fuel. The solid fuel may be almost any carbonaceous material, but is generally selected from materials such as coal, charcoal, flue dust, carbon, coke and wood chips. The solid fuel, normally having a particle size range of ¼ inch – ⅛ inch and smaller, is intimately mixed with the unreduced manganese ore prior to addition to the reduction pile, in an ore-fuel ratio ranging from 20:1 to 5:1 by weight, i.e. about 5–17% solid fuel.

In the process, new ore-fuel additions are made periodically to form a progressively larger bed, pile or column. Sufficient time is allowed between additions for the previous feed to undergo at least partial reduction.

The reduction process progresses outwardly through the various phases shown in FIG. 1, moving steadily through the contiguous feed layers.

Additions to the pile are continued until it grows impractically large in size, preventing the formation of uniform layers, or until the gas flow patterns become too uneven for smooth reduction. After additions have ceased a few hours are allowed for reduction of the final ore layers. The primary gas flow is then cut off, and the ore is then processed through a cooling step and finely milled to the desired particle size.

The temperature profile of an operating pile is shown in FIG. 2 as a function of time. This temperature sequence represents one point in a newly-charged ore-fuel layer, and is typical of a number of observations, each similar but varying somewhat depending upon the position of the measuring device, the gas blow rate, the size or stage of development of the pile, and so forth. The approximate reaction "phase" boundaries with time are also indicated in FIG. 2.

The process of the invention is further illustrated in the following specific examples.

EXAMPLE 1

An 8 feet by 1½ feet hearth was formed in the ground connected to an external combustion chamber through an insulated pipe. Propane was burned with air in the forward portion of the combustion chamber to produce about 250 s.c.f.m. of combustion gases containing about 2% by volume of reducibles. Steam was introduced into the gas stream in the after portion of the combustion chamber to moderate the temperature of the gas entering the transfer pipe to about 900° C. The gas was passed into the hearth and through a coarse slag distribution bed about 7 feet by 12 feet by 1½ feet high. When the slag was preheated, a feed of Australian manganese ore (¼ inch and smaller) mixed with crushed coal (¼ inch and smaller) was initiated. The coal to ore ratio was 1 to 10 by weight. Ore-coal additions were made in successive 4 to 6 inch layers, allowing sufficient time between additions for at least partial reduction of the previous layer.

Ore-coal mixture was added in this manner for a period of 24 hours, during which a total of about 35 tons of mixture was added. After the last addition, an additional eight hours was allowed to complete reduction of the final layers. At the end of the 32 hour reduction period the primary gas feed was turned off. The reduced ore was cooled and milled to a particle size of −200 mesh. The final product had a weight of 31½ tons, and analyzed 61.9% Mn and 6.56% $MnO_2$. The residual carbon content was 1.4%.

EXAMPLE 2

The hearth of the previous example was expanded to 12 feet by 1½ feet and covered with a correspondingly larger bed of slag for gas distribution. Following initial pre-heating of the bed an ore-coal mix was added over 31 hours as in Example 1. An additional 12 hours was allowed to complete the reduction. In this experimental run the ratio of Australian manganese ore to coal was 11 to 1 by weight. The burner rate was increased in proportion to the increase in hearth size to about 375 s.c.f.m. of primary gas. A water spray was introduced into the after portion of the combustion chamber to control the exit gas temperature.

After cooling and milling it was found that 40½ tons of reduced ore had been produced, averaging 62.4% Mn, 4.92% $MnO_2$ and 1.27% carbon. In the course of the analysis it was further determined that over ⅓ of the product contained less than 1% $MnO_2$ and ⅔ contained less than 2% $MnO_2$. This indicates that the process is capable of producing a product with a very low $MnO_2$ content. The higher average $MnO_2$ values reflect minor processing variables associated with the experimental runs.

What is claimed is:
1. A process for the pile reduction of higher oxides of manganese in manganese ore, which comprises passing non-oxidizing gas at 700°–1000° C. into and through an initial bed of solid carbonaceous fuel and manganese ore which has been at least partially reduced to MnO, then directing the resulting hot reducing gas mixture into a contiguous layer of unreduced manganese ore mixed with solid carbonaceous fuel.
2. The process of claim 1 wherein the non-oxidizing gas contains substantial amounts of $CO_2$, $H_2O$, or a mixture thereof.
3. The process of claim 1 wherein the non-oxidizing gas is maintained at a temperature of 850°–950° C.
4. The process of claim 1 wherein the higher oxides in the unreduced manganese ore are $MnO_2$, $Mn_2O_3$ and $Mn_3O_4$.
5. The process of claim 1 wherein the unreduced manganese ore is crushed ore having a particle size up to about ¾ inch.
6. The process of claim 1 wherein the unreduced manganese ore and solid carbonaceous fuel are mixed in a ratio of from 20:1 to 5:1 by weight.
7. The process of claim 1 wherein the solid carbonaceous fuel is selected from coal, charcoal, flue dust, carbon, and coke.
8. The process of claim 1 wherein the mixture of unreduced ore and carbonaceous fuel is reduced to substantially all MnO.
9. The process of claim 1 wherein fresh layers of unreduced manganese ore mixed with solid carbonaceous fuel are successively added as the reduction proceeds.
10. A process for the pile reduction of the higher oxides of manganese present in manganese ore to manganous oxide, which comprises
   mixing crushed, unreduced manganese ore having a particle size in the range of ¼ inch and smaller to ¾ inch and smaller with crushed coal having a particle size of ⅛ to ¼ inch and smaller in a ratio of 8–12 parts ore to 1 part coal by weight;
   generating a non-oxidizing gas containing substantial amounts of $CO_2$;
   injecting $H_2O$ into the non-oxidizing gas to reduce the temperature to 850°–950° C.;
   passing the resulting non-oxidizing primary gas upwardly through an open hearth covered by a bed of coarse slag and a pile of mixed ore and coal until the ore is at least partially reduced to MnO;
   continuing the passage of the non-oxidizing primary gas upwardly through the MnO to form a hot reducing gas mixture while feeding fresh ore and coal mixture periodically to the surface of the pile in contiguous layers;
   terminating the feeding of ore and coal mixture when it is no longer possible to maintain a substantially uniform layer of unreduced ore and coal mixture on the exterior of the pile;
   continuing the passage of non-oxidizing primary gas and hot reducing gas mixture until the unreduced ore layer on the exterior of the pile has been substantially reduced to MnO.

* * * * *